United States Patent [19]

Yamamoto

[11] Patent Number: 4,488,775
[45] Date of Patent: Dec. 18, 1984

[54] LIGHT ABSORPTIVE FILM HAVING AN ANTI-REFLECTING PROPERTY

[75] Inventor: Kimiaki Yamamoto, Tucson, Ariz.

[73] Assignee: Olympus Optical Co., Ltd., Tokyo, Japan

[21] Appl. No.: 377,174

[22] Filed: May 11, 1982

[30] Foreign Application Priority Data

May 26, 1981 [JP] Japan ............... 56-79920

[51] Int. Cl.³ ............... G02B 1/10; G02B 5/22
[52] U.S. Cl. ............... 350/164; 350/1.7; 350/163
[58] Field of Search ............... 350/1.7, 164, 163, 166, 350/292

[56] References Cited

U.S. PATENT DOCUMENTS

| | | | |
|---|---|---|---|
| 2,782,676 | 2/1957 | Osterberg | 350/164 |
| 3,649,539 | 3/1972 | Apfel et al. | 350/166 |
| 4,381,883 | 5/1983 | Yamamoto et al. | 350/164 |

FOREIGN PATENT DOCUMENTS 56-12615 6/1981 Japan.
56-8107 10/1981 Japan.

OTHER PUBLICATIONS

Driscoll et al., *Handbook of Optics*, 1978, pp. 8-48 to 8-49.

*Primary Examiner*—John K. Corbin
*Assistant Examiner*—William Propp
*Attorney, Agent, or Firm*—Cushman, Darby & Cushman

[57] ABSTRACT

A light absorptive film comprising a first sub-film and a second sub-film each including at least one dielectric layer and at least one metallic layer which have anti-reflecting functions even when used independently and arranged oppositely on both sides of another dielectric layer. Said light absorptive film exhibits anti-reflecting effect for light incident on said first sub-film and said second sub-film.

11 Claims, 5 Drawing Figures

LIGHT ABSORPTIVE FILM HAVING AN ANTI-REFLECTING PROPERTY

BACKGROUND OF THE INVENTION (a) Field of the invention:

The present invention relates to a light absorptive film having an anti-reflecting property.

(b) Description of the prior art:

As is known to those skilled in the art, the optical system of a phase contrast microscope has such a construction as shown in FIG. 1. Speaking concretely with reference to this drawing, the reference numeral 1 represents a condenser lens, the reference numeral 2 designates an annular aperture stop arranged at the front focal point of said condenser lens or in the vicinity thereof, the reference numeral 3 denotes an object to be subjected to microscopy, the reference numeral 4 represents an objective lens, the reference numeral 5 designates a phase plate arranged at the rear focal point of the objective lens 4 or in the vicinity thereof and at the position conjugate with the annular aperture stop with regard to the condenser lens 1 and objective lens 4, and the reference numeral 6 denotes the position of an image of the object formed with the objective lens 5.

In the phase contrast microscope having the composition as described above, the light emitted from a light source is passed through the aperture 2a of the annular aperture stop, made into parallel rays by the condenser lens 1 and passes through the object. An image of the clear object 3 is formed on an image plane 6 by causing a phase difference of ¼ wavelength and an adequate absorption of the zero-order diffracted light having passed through the specimen with the phase plate 5.

Further, a high resolution microscope can be composed by arranging an annular filter in place of the phase plate in the optical system shown in FIG. 1 as described in Japanese unexamined published patent application No. 12615/81.

In the phase contrast microscope or the high resolution microscope, flare or ghost may be produced due to the light reflected on the surface of the phase plate or the annular filter used in the microscope. It is therefore an important requirement for the phase plate used in the phase contrast microscope or the annular filter used in the high resolution microscope to eliminate the light reflected on the surface thereof. That is to say, it is possible to prevent flare or ghost from being produced by equipping the phase plate or annular filter with a function for anti-reflection, which is an important factor for governing performance of the phase plate or annular filter. As an example of light absorptive film (phase plates, annular filters, etc.) having such a function for anti-reflection, the one disclosed by Japanese unexamined published patent application No. 8107/81 has already been known to those skilled in the art. This light absorptive film has a composition consisting of two layers, i.e., a metallic layer b and a dielectric layer a arranged on the incidence side thereof, as shown in FIG. 2. In this light absorptive film, let use represent refractive index of the dielectric layer a by $n_1$ and designate complex refractive index of the metallic layer b by $n_2$. Let us further assume that a glass plate having a refractive index $n_0$ is arranged on the incidence side of the dielectric layer a, and a dielectric layer having a refractive index $n_3$ is arranged on the emerging side of the metallic layer b of the light absorptive film. Moreover, let use represent amplitude reflection factor (Fresnel's reflection coefficient) of the boundary surface 1S between the dielectric layer and upper layer (glass plate) by $r_0$, designate amplitude reflection factor of the boundary surface 2S between the dielectric layer a and metallic layer b by $r_1$, and denote amplitude reflection factor of the boundary surface 3S between the metallic layer b and substance (dielectric layer) located on the emerging side thereof by $r_2$. Then, in order to equip the light absorptive film shown in FIG. 2 with an anti-reflecting function, it is important to cancel the light reflected by the boundary surface 2S having high reflectance by using a light reflected on another surface. For this purpose, it is necessary to select refractive indices of the dielectric layer a and metallic layer b so as to satisfy conditions of $n_1 \neq n_3$ and $|r_2| < |r_2|$ since light is attenuated while passing through the metallic layer b. Further, in order to cancel the light reflected on the boundary surface 3S having such a high reflectance with the light reflected on the boundary surface 2S, it is important to select thickness of the metallic layer b so that the light reflected on the boundary surface 3S and reaching the boundary surface 2S will be in a phase neary opposite to that of the light reflected on the boundary surface 2S (to produce a phase difference of $\pi$). The light absorptive film disclosed by Japanese unexamined published patent application No. 12615/81 is designed for anti-reflection as described above.

SUMMARY OF THE INVENTION

A general object of the present invention is to provide a light absorptive film comprising two sub-films including a dielectric layer and a metallic layer designed so as to have sufficient anti-reflecting function even when they are used independently, and arranged oppositely on both sides of another dielctric layer, said light absorptive film being so adapted as to exhibit anti-reflecting function even when light is incident in either direction on either one of the sub-film and assure improved anti-reflecting function.

DESCRIPTION OF THE PREFERRED EMBODIMENTS

Figure 1:
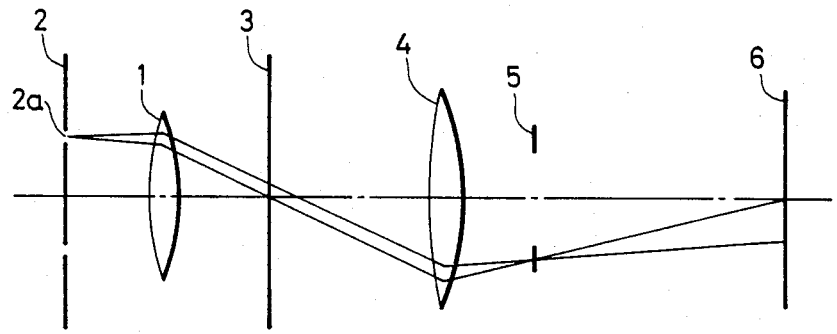
FIG. 1 shows a sectional view illustrating the composition of the optical system of a phase contrast microscope or high resolution microscope using the light absorptive film according to the present invention.
Figure 2:
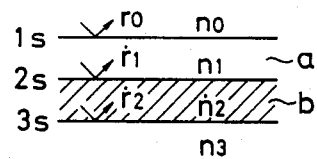
FIG. 2 shows a sectional view illustrating the composition of the conventional light absorptive film.
Figure 3:
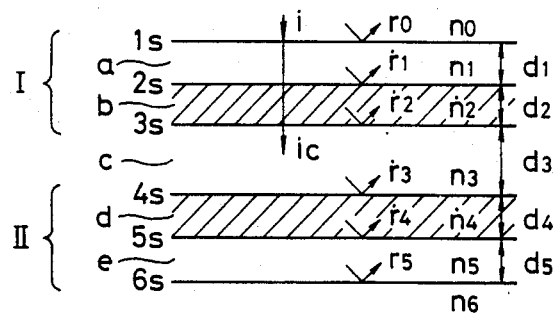
FIG. 3 shows a sectional view illustrating composition of the light absorptive film as an embodiment of the present invention.

FIG. 3 shows the composition of the light absorptive film preferred as an embodiment of the present invention. In this drawing, the reference symbol I represents a sub-film consisting of a dielectric layer a and a metallic layer b, designed on the same principle as that of the conventional example and having a anti-reflecting function for light incident from above the drawing when said sub-film I is considered independently. The reference symbol II designates a sub-film consisting of a metallic layer d and a dielectric layer e, oppositely to said sub-film I, designed on the same principle as that of the conventional example and having anti-reflecting function for light incident from under the drawing. The reference symbol c denotes a dielectric layer which is different from either one of the sub-film I and II. As is understood from the above description, the light absorptive film according to the present invention comprises the two sub-films I and II which are arranged on both sides (upper and lower sides in the drawing) of the dielectric layer c.

In the light absorptive film having such a composition, the sub-film I has an anti-reflecting function for light incident from above the drawing. The light passing through the sub-film I is absorbed by the metallic layer b to a certain degree and attenuated light $i_c$ is incident on the sub-film II. The light $i_c$ has been attenuated and is sufficiently weaker than the incident light i. Therefore, the boundary surface 4S of the metallic layer d of the sub-film II reflects a very weak light out of the light $i_c$. Further, the light reflected on the boundary surface 4S is partially cancelled by the light reflected on the boundary surface 5S and is further weakened accordingly. Moreover, the light reflected on the boundary surface 4S is partially absorbed by the metallic layer b while passing through the sub-film I. Therefore, the light travelling in the direction opposite to the incident light (upward in FIG. 3) after having been reflected by the boundary surface 4S and passed through the sub-film I is very weak. In addition, light reflected in the entire light absorptive film can be further reduced since the light reflected on the boundary surface 4S can be cancelled by a portion of the light reflected on the boundary surface 2S of the sub-film I. That is to say, it is possible to improve the anti-reflecting function of the light absorptive film.

Further, since the light absorptive film of this embodiment has a composition which is substantially symmetrical with regard to the dielectric layer c, the light absorptive film has an anti-reflecting function for light incident from underside similar to that for the light incident from above.

Therefore, the light absorptive film of this embodiment exhibits the similar anti-reflecting function when the sub-film I or II is arranged on the side of incident light.

Now, descriptions will be given on the amplitude condition for this embodiment to cancel the light reflected by the sub-film II while the light $i_c$ having passed through the sub-film I is passing through the sub-film II with the portion of the incident light i reflected by the sub-film I. Let us represent reflection factor of the boundary surface 1S by $r_0$, designate reflection factor of the boundary surface 2S by $r_1$ and denote reflection factor of the boundary surface 3S by $r_2$. For the amlitude requirement described above, it is desirable to select optical thickness (refractive index x thickness) of the dielectric layer c so as to be $\lambda/4 \times$ an odd integer in case of $|r_0| + |r_2|e^{-\gamma} < |r_1|$, or $\lambda/4 \times$ an even integer in case of $|r_0| + |r_2|e^{-\gamma} > |r_1|$, wherein the factor $\gamma$ has a value to satisfy $4\pi n_2 d_2/\lambda = \delta - i\gamma$ (i: imaginery unit). That is to say, $\gamma$ represents the imaginery part of the left side of the equation mentioned above ($\delta$ represents the real part).

Figure 4:
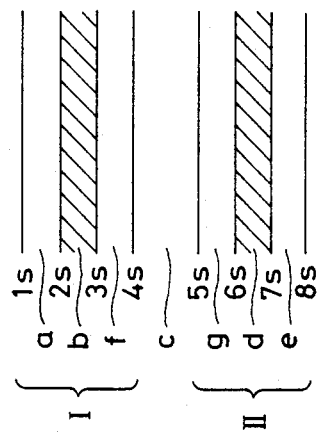
FIG. 4 shows a sectional view illustrating composition of another embodiment of the present invention.

When complete anti-reflection is not required for the light absorptive film described above, the optical thickness of the dielectric layer c need not be exactly $\lambda/4 \times$ an odd integer or $\lambda/4 \times$ an even integer but may be set at an optical value near the thickness defined above. It is therefore possible to control degree of phase variation of the light passing through the light absorptive film by selecting thickness of the dielectric layer c. Further, transmission factor of the light absorptive film according to the present invention can be adjusted to certain degrees by varying thicknesses of the metallic layers b and d. The layers of the sub-films I and II of the light absorptive film of the embodiment, i.e., the dielectric layer a, dielectric layer e, metallic layer b and metallic layer d may be made of the same substance or different materials. For applying the light absorptive film according to the present invention to a phase plate or filter in a high resolution microscope, it is desirable that phase variation of transmission light is free from wavelength dependency (degree of phase variation is different depending on wavelengths). In such a case, wavelength dependency of transmission light can be minimized in the entire light absorptive film as a whole by selecting different materials for the sub-films I and II so that the sub-films I and II will have wavelength dependencies opposite to each other. Though each of the sub-films I and II consists of two layers in the light absorptive film described in the above embodiment, it is not always necessary to design it in such a composition. FIG. 4 shows another embodiment of the light absorptive film according to the present invention in which each of the sub-films I and II consists of three layers. Speaking more concretely, this light absorptive film comprises the sub-film I consisting of dielectric layers a and f arranged on both sides of the metallic layers b, and the sub-film II consisting of dielectric layers g and e arranged on both sides of the metallic layer d.

Further, the light absorptive film according to the present invention can be so designed as to comprise the sub-films I and II each of which consists of four or more layers. Needless to say, it is desirable to adjust thicknesses of the individual layers (dielectric layers and metallic layers) of the light absorptive film according to the present invention so as to obtain optimum overall spectral reflection factor, absorption factor and so on.

Now, numerical data of the light absorptive film of the present invention will be exemplified below:

| Numerical data A | |
|---|---|
| $n_0 = 1.52$ (glass plate) | |
| $n_1 = 2.33$ | $d_1 = 30$ nm |
| $n_2 = 1.97-3.33\,i$ | $d_2 = 10.2$ nm |
| $n_3 = 1.33$ | $d_3 = 300.8$ nm |
| $n_4 = 1.97-3.33\,i$ | $d_4 = 10.2$ nm |
| $n_5 = 2.33$ | $d_5 = 30$ nm |
| $n_6 = 1.52$ (glass plate) | |

| Numerical data B | |
|---|---|
| $n_0 = 1.52$ (glass plate) | |
| $n_1 = 2.33$ | $d_1 = 38.6$ nm |
| $n_2 = 1.97-3.33\,i$ | $d_2 = 10.2$ nm |
| $n_3 = 1.33$ | $d_3 = 142.9$ nm |
| $n_4 = 1.97-3.33\,i$ | $d_4 = 10.2$ nm |
| $n_5 = 2.33$ | $d_5 = 30$ nm |
| $n_6 = 1.52$ (glass plate) | |

| Numerical data C | |
|---|---|
| $n_0 = 1.52$ (glass plate) | |
| $n_1 = 2.33$ | $d_1 = 30$ nm |
| $n_2 = 1.97-3.33\,i$ | $d_2 = 9.1$ nm |
| $n_3 = 1.33$ | $d_3 = 127.8$ nm |
| $n_4 = 1.97-3.33\,i$ | $d_4 = 12.7$ nm |
| $n_5 = 2.33$ | $d_5 = 30$ nm |
| $n_6 = 1.52$ (glass plate) | |

| Numerical data D | |
|---|---|
| $n_0 = 1.52$ (glass plate) | |
| $n_1 = 2.33$ | $d_1 = 30$ nm |
| $n_2 = 1.97-3.33\,i$ | $d_2 = 10.2$ nm |
| $n_3 = 1.33$ | $d_3 = 103$ nm |
| $n_4 = 0.89-1.51\,i$ | $d_4 = 31.5$ nm |
| $n_5 = 2.33$ | $d_5 = 23.9$ nm |
| $n_6 = 1.52$ (glass plate) | |

Figure 5:
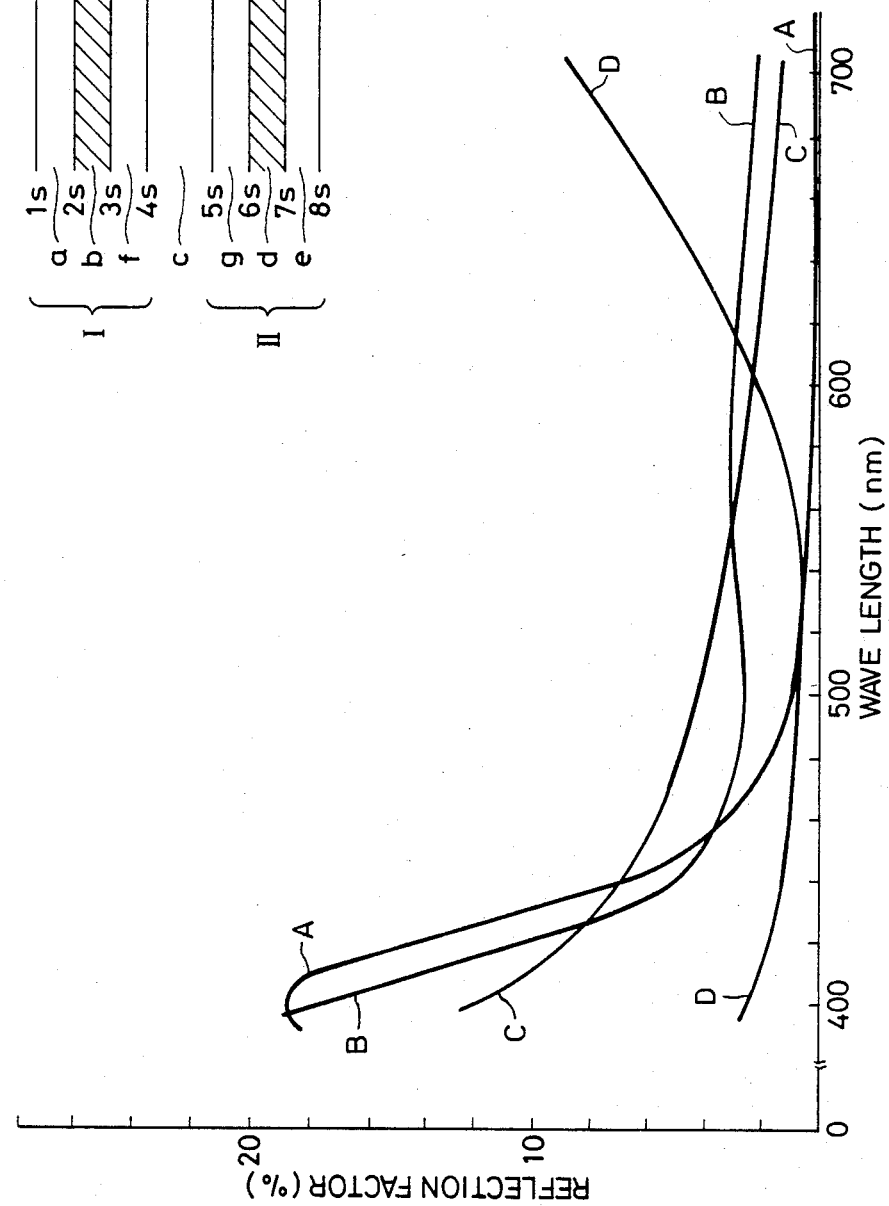
FIG. 5 shows curves illustrating spectral transmission characteristics corresponding to examples of numerical data of the light absorptive film according to the present invention.

The above numerical data are given for light absorptive films which have the same composition as that shown in FIG. 3 and spectroscopic reflection characteristics visualized as curves A, B, C and D in FIG. 5.

As is understood from FIG. 5, very high anti-reflecting functions is obtained in all the examples of the numerical data. In example D of the numerical data, the metallic layers in the sub-films I and II are made of different materials to minimize wavelength dependency of phase variation of transmission light. This will be understood from the fact that the spectral transmission characteristic curve D has curvature opposite to those of the other curves.

As is clear from the foregoing descriptions, the light absorptive film according to the present invention has very high anti-reflecting function and permits microscopy with no influence due to flare or ghost when said light absorptive film is used in a phase contrast microscope or high resolution microscope. Further, the light absorptive film according to the present invention exhibits the anti-reflecting function for light incident in both the directions. Furthermore, the present invention makes it possible to adjust phase variation degree of transmission light and transmittance. Moreover, the present invention makes it possible to minimize wavelength dependency of phase variation.

I claim:

1. A light absorptive film comprising a first sub-film comprising a first dielectric layer and a first metallic layer, a second sub-film comprising a second dielectric layer and a second metallic layer, and a third dielectric layer, said first and second sub-films being arranged oppositely on both the sides of said third dielectric layer and said light absorptive film having the following numerical data:

| $n_0 = 1.52$ (glass plate) | |
|---|---|
| $n_1 = 2.33$ | $d_1 = 30$ nm |
| $n_2 = 1.97-3.33i$ | $d_2 = 10.2$ nm |
| $n_3 = 1.33$ | $d_3 = 300.9$ nm |
| $n_4 = 1.97-3.33i$ | $d_4 = 10.2$ nm |
| $n_5 = 2.33$ | $d_5 = 30$ nm |
| $n_6 = 1.52$ (glass plate) | |

2. A light absorptive film comprising a first sub-film comprising a first dielectric layer and a first metallic layer, a second sub-film comprising a second dielectric layer and a second metallic layer, and a third dielectric layer, said first and second sub-films being arranged oppositely on both the sides of said third dielectric layer and said light absorptive film having the following numerical data:

| $n_0 = 1.52$ (glass plate) | |
|---|---|
| $n_1 = 2.33$ | $d_1 = 38.6$ nm |
| $n_2 = 1.97-3.33\,i$ | $d_2 = 10.2$ nm |
| $n_3 = 1.33$ | $d_3 = 142.9$ nm |
| $n_4 = 1.97-3.33\,i$ | $d_4 = 10.2$ nm |
| $n_5 = 2.33$ | $d_5 = 30$ nm |
| $n_6 = 1.52$ (glass plate) | |

3. A light absorptive film comprising a first sub-film comprising a first dielectric layer and a first metallic layer, a second sub-film comprising a second dielectric layer and a second metallic layer and a third dielectric layer, said first and second sub-films being arranged oppositely on both the sides of said third dielectric layer and said light absorptive film having the following numerical data:

| $n_0 = 1.52$ (glass plate) | |
|---|---|
| $n_1 = 2.33$ | $d_1 = 30$ nm |
| $n_2 = 1.97-3.33\,i$ | $d_2 = 9.1$ nm |
| $n_3 = 1.33$ | $d_3 = 127.8$ nm |
| $n_4 = 1.97-3.33\,i$ | $d_4 = 12.7$ nm |
| $n_5 = 2.33$ | $d_5 = 30$ nm |
| $n_6 = 1.52$ (glass plate) | |

4. A light absorptive film comprising a first sub-film having a light absorptive function when used independently, and comprising a first dielectric layer and a first metallic layer, and a second sub-film having a light absorptive function when used independently, and comprising a second dielectric layer and a second metallic layer, and a third dielectric layer, said first and second sub-films being arranged oppositely on both the sides of said third dielectric layer, said first and second dielectric layers being made of the same material, and said first and second metallic layers being made of different materials.

5. A light absorptive film according to claim 4 having the following numerical data.

| $n_0 = 1.52$ (glass plate) | |
|---|---|
| $n_1 = 2.33$ | $d_1 = 30$ nm |
| $n_2 = 1.97-3.33\,i$ | $d_2 = 10.2$ nm |
| $n_3 = 1.33$ | $d_3 = 103$ nm |
| $n_4 = 0.89-1.51\,i$ | $d_4 = 31.5$ nm |
| $n_5 = 2.33$ | $d_5 = 23.9$ nm |
| $n_6 = 1.52$ (glass plate) | |

6. A light absorptive film according to claim 4 wherein wavelength dependency of phase variation of transmission light of said first metallic layer is made opposite to that of said second metallic layer.

7. A light absorptive film comprising a first sub-film having a light absorptive function when used independently, and comprising a first dielectric layer and a first metallic layer, a second sub-film having a light absorptive function when used independently, and comprising a second dielectric layer and a second metallic layer, and a third dielectric layer, said first and second sub-films being arranged oppositely on both the sides of said third dielectric layer, said first and second dielectric layers being made of different materials, and said first and second metallic layers being made of different materials.

8. A light absorptive film according to claim 7 wherein wvelength dependency of phase variation of transmission light of the first metallic layer is opposite to that of said second metallic layer.

9. A light absorptive film according to claim 7 wherein each of said first and second sub-film consists of a dielectric layer, a metallic layer and a dielectric layer.

10. A light absorptive film comprising a first sub-film consisting of a first dielectric layer and a first metallic layer, a second sub-film consisting of a second dielectric layer and a second metallic layer, and a third dielectric layer, said first and second sub-films are arranged oppositely on both the sies of said third dielectric layer, said light absorptive film satisfying a condition of $|r_0| + |r_2|e^{-\gamma} < |r_1|$ and said third dielectric layer has an optical thickness equal to $\lambda/4$ multiplied by an odd integer, wherein the reference symbol $r_0$ represents reflectance of the incidence surface of said first dielectric component layer, the reference symbol $r_1$ designates reflectance of the boundary surface between said first dielectric layer and said first metallic layer, and the reference symbol $r_2$ denotes reflectance of the boundary surface between said first metallic layer and said third dielectric layer.

11. A light absorptive film comprising a first sub-film consisting of a first dielectric layer and a first metallic layer, a second sub-film consisting of a second dielectric layer and a second metallic layer, and a third dielectric layer, said first and second sub-films being arranged oppositely on both the sides of said third dielectric layer, said light absorptive film satisfying a condition of $|r_0| + |r_2|e^{-\gamma} > |r_1|$ and said third dielectric layer having an optical thickness equal to $\lambda/4$ multiplied by an even integer, wherein the reference symbol $r_0$ represents reflectance of the incidence surface of said first dielectric component layer, the reference symbol $r_1$ designates reflectance of the boundary surface between said first dielectric layer and said first metallic layer, and the reference symbol $r_2$ denotes reflectance of the boundary surface between said first metallic layer and said third dielectric layer.

* * * * *